United States Patent [19]

Nordstrom

[11] Patent Number: 5,314,049

[45] Date of Patent: May 24, 1994

[54] SHIFTER PARK POSITION BRAKE-TRANSMISSION INTERLOCK

[75] Inventor: Paul D. Nordstrom, Redford, Mich.

[73] Assignee: Dura Mechanical Components, Inc., Troy, Mich.

[21] Appl. No.: 980,718

[22] Filed: Nov. 24, 1992

[51] Int. Cl.[5] ............................................. B60K 41/28
[52] U.S. Cl. ............................... 192/4 A; 74/483 R; 180/271
[58] Field of Search ............ 192/4 A; 74/483 R, 878; 70/245, 247, 248; 180/271

[56] References Cited

U.S. PATENT DOCUMENTS

| | | | |
|---|---|---|---|
| 3,994,183 | 11/1976 | Markl | 74/473 |
| 4,473,141 | 9/1984 | Mochida . | |
| 4,905,802 | 3/1990 | Gotoh | 192/4 A |
| 4,909,096 | 3/1990 | Kobayashi | 74/538 |
| 4,934,496 | 6/1990 | Barske et al. | 192/4 A |
| 4,938,042 | 7/1990 | Muramatsu | 70/245 |
| 4,942,937 | 7/1990 | Amberger et al. | 180/271 |
| 4,947,967 | 8/1990 | Kito et al. | 192/4 A |
| 5,003,799 | 4/1991 | Imai et al. | 70/247 |
| 5,025,901 | 6/1991 | Kito et al. | 192/4 A |
| 5,062,509 | 11/1991 | Carpenter et al. | 192/4 A |
| 5,080,208 | 1/1992 | Sakuma et al. | 192/4 A |
| 5,127,245 | 7/1992 | Imai et al. | 70/247 |

Primary Examiner—Richard M. Lorence
Attorney, Agent, or Firm—David A. Greenlee

[57] ABSTRACT

A shifter for an automatic transmission is prevented from shifting out of Park position when the ignition switch is on unless the service brake is applied. An articulated solenoid-operated blocking arm is positioned to selectively block movement of a locking pin to prevent the shift lever from leaving the Park position of the shift gate. A circuit, including switches responsive to ignition, service brake application and shift lever position, controls solenoid activation. A cam responsive to the shift lever release button and to the lever position controls the shift lever position switch. The blocking arm can comprise two segments joined by a hinge. In blocking position, the hinge lies on one side of the path of pin movement. If the pin release is prematurely actuated, the pin engages the blocking arm. Subsequent solenoid activation pushes the hinge overcenter so that pin force will collapse the blocking arm, enabling its movement out of blocking position by the solenoid. An alternative blocking arm is an integral plastic piece with two segments interconnected by an integral hinge or two independent segments interconnected by a hinge pin. Alternatively, the blocking arm can comprise a single segment mounted for movement by a pin-and-slot arrangement.

20 Claims, 4 Drawing Sheets

SHIFTER PARK POSITION BRAKE-TRANSMISSION INTERLOCK

BACKGROUND OF THE INVENTION

This invention relates generally to a brake-transmission interlock and particularly to a mechanism for permitting automatic transmission shifter movement from Park position only when the vehicle service brake is applied.

In automobiles with an automatic transmission, it is a preferred practice for the operator to apply the service brakes at the time the transmission selector lever is moved from Park position to one of the Drive range positions. This practice not only assures that the vehicle is held stationary during this shift, but also assures that the operator's foot does not inadvertently operate the accelerator pedal. It has been proposed to provide an interlock mechanism to prevent shifting out of Park position unless a brake is first applied.

A shift lever and parking brake control which has a pin on a shift lever movable through a shift gate having a Park position is shown in U.S. Pat. No. 4,473,141 to Mochida. An electromagnetically controlled plunger spring is biased into the gate to block pin movement into or out of the Park position. The electromagnet is electrically connected in series with a parking brake switch and an ignition switch. This causes the plunger to be withdrawn by the electromagnet to permit shifting between Park and Reverse only when the engine is running and the parking brake is on.

An electromagnetically controlled lock for a shift selector which is released for operation when ignition is turned on is disclosed in U.S. Pat. No. 3,994,183 to Markl. A brake interlock is not included in this disclosure.

In another brake-transmission interlock in current use, a pin on a shift lever movable through a shift gate having a Park position is blocked from leaving the Park position by a solenoid operated blocking member in the path of the pin. The blocking member is pivotally mounted on the same axis as the shift lever for movement between blocking and release positions. A solenoid, actuated only when the service brake is released, moves the blocking member to a blocking position and when the brake is applied, a spring moves the member to a noninterfering position.

Another brake-transmission interlock in current use is illustrated in U.S. Pat. No. 5,062,509 to Carpenter et al, and owned by the assignee hereof. In this shifter, the blocking member is pivoted commonly with the shift lever and presents a radial shoulder blocking radially inward movement of a release pin by the shift lever-mounted release button. This shoulder prevents movement of the release pin out of the Park position notch in the shift gate and subsequent movement of the shift lever out of Park position.

A problem encountered with this arrangement is that premature depression of the release pin (prior to actuation of the solenoid by depressing the brake pedal) will cause the release pin to engage the outer surface of the blocking member. This engagement produces a frictional force which can be substantial if the release button is depressed firmly. If this force is large enough, it can cause the pin to bind up the blocking member and prevent its movement out of blocking position by the solenoid.

Thus, it is desirable to provide a brake-transmission interlock having a blocking member that cannot be bound up by premature depression of the shifter release button.

SUMMARY OF THE INVENTION

It is therefore an object of the invention to provide a brake-transmission interlock having a blocking member that cannot be bound up by premature depression of the shifter release button.

In one aspect, this invention features a transmission shifter having a shift gate defining a locking notch, a shift lever movable along said gate into and out of alignment with said notch, and a locking pin carried by the lever for movement along a path into and out of said notch. A blocking arm is movable into and out of a normal blocking position in the path of pin movement and has a surface extending perpendicular to the path of pin movement which is engageable by the locking pin. The blocking arm is configured to enable movement of the blocking arm outer surface along said path out of engagement with the locking pin when the actuator begins moving the locking arm out of said path.

In another aspect, this invention features a blocking arm configured to include a movable hinge about which the blocking arm pivots upon movement by the actuator to enable movement of the outer surface along said path.

Preferably, the blocking arm comprises a pair of elements interconnected by the hinge which lies to one side of the locking pin path when the locking arm is in blocking position so that a force exerted by the locking pin on the blocking arm forces the arm portions rigidly together. Also, preferably the shift lever and the blocking arm are commonly pivoted for independent movement along said shift gate, while the blocking arm is a unitary piece of plastic interconnected by an integral hinge.

In yet another aspect, this invention features a brake-transmission interlock for a vehicle having an automatic transmission, an ignition switch and a service brake operator, and an automatic transmission shifter. The shifter comprises a base mounting, a shift gate which defines a plurality of notches corresponding to the Park and other transmission positions, a shift lever pivotable between the Park and other transmission positions, and a locking pin carried by the shift lever for movement along a radial path into the shift gate Park notch to lock the shift lever in Park position and for movement out of said notch to enable shift lever movement out of Park position. A blocking arm is mounted on the base and has a movable hinge enabling movement of the arm into and out of the blocking position in the path of movement of the locking pin when the shift lever is in Park position and has a radially outer surface perpendicular to the path of pin movement which is engageable by the locking pin to block movement of the locking pin out of said notch. An actuator comprising an electric solenoid normally locates the blocking arm in blocking position and is actuatable in response to operation of the service brake operator and closure of the ignition switch to move the blocking arm out of blocking position. The blocking arm movable hinge is movable to collapse the arm inwardly away from the pin in response to pin force upon initial movement of the blocking arm out of blocking position by the actuator. Subsequent movement of the blocking arm out of blocking position by the actuator enables the outer surface to disengage the pin.

In a further aspect, this invention features a transmission shifter having a shift gate defining a locking notch, a shift lever movable along said gate into and out of alignment with said notch, and a locking pin carried by the lever for movement along a path into and out of said notch. A blocking arm is movable into and out of a normal blocking position in the path of pin movement and has an outer surface engageable by the locking pin. An actuator is operable to move the blocking arm out of blocking position. The blocking arm has a movable hinge which lies to one side of the locking pin path when the locking arm is in blocking position to prevent movement of the blocking arm out of blocking position by a force exerted on the blocking arm outer surface by the locking pin. Initial movement of the blocking arm by the actuator moves the hinge to the other side of the locking pin path. This enables the force exerted by the locking pin to pivot the blocking arm on the hinge to move the blocking arm surface along said path to disengage the locking pin as the locking arm is moved out of blocking position by the actuator.

Preferably, the blocking arm comprises a pair of segments interconnected by the hinge, whereby the outer end of one segment is pivotally mounted on the shifter and the outer end of the other segment includes the outer surface. The force exerted by the locking pin on the outer surface normally forces the arm segments rigidly together. However, when the hinge is moved to the other side of the locking pin path by the actuator, the force exerted by the locking pin articulates the arm segments. This moves the blocking arm surface along the path to disengage the locking pin as the locking arm is moved out of blocking position by the actuator.

These and other objects and features of this invention will become readily apparent upon reference to the following description of a preferred embodiment, as illustrated in the accompanying drawings, in which:

DETAILED DESCRIPTION OF A PREFERRED EMBODIMENT

Figure 1:
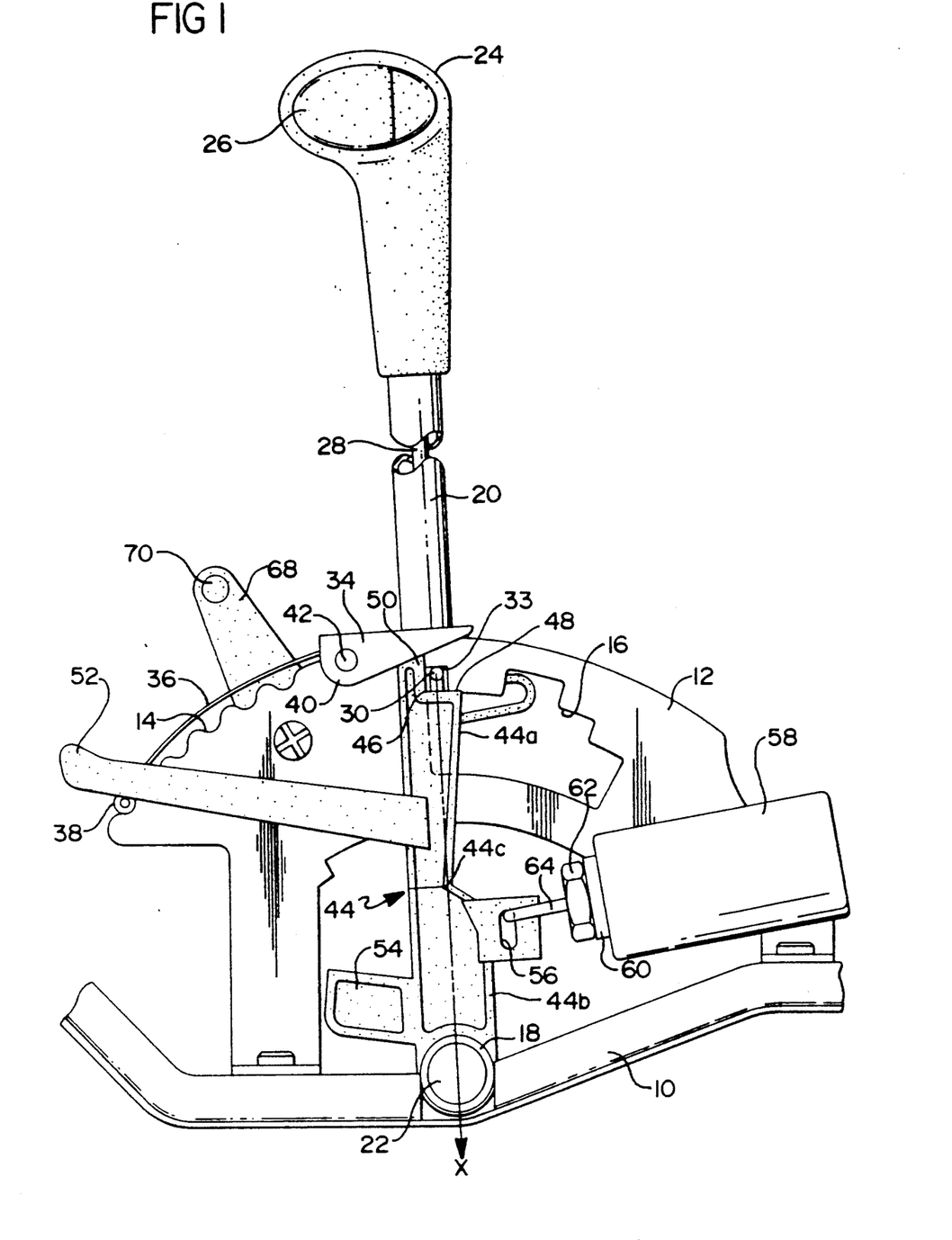
FIG. 1 is a side elevational view of a shift mechanism with brake interlock having a blocking arm according to the invention shown in blocking position.
Figure 2:
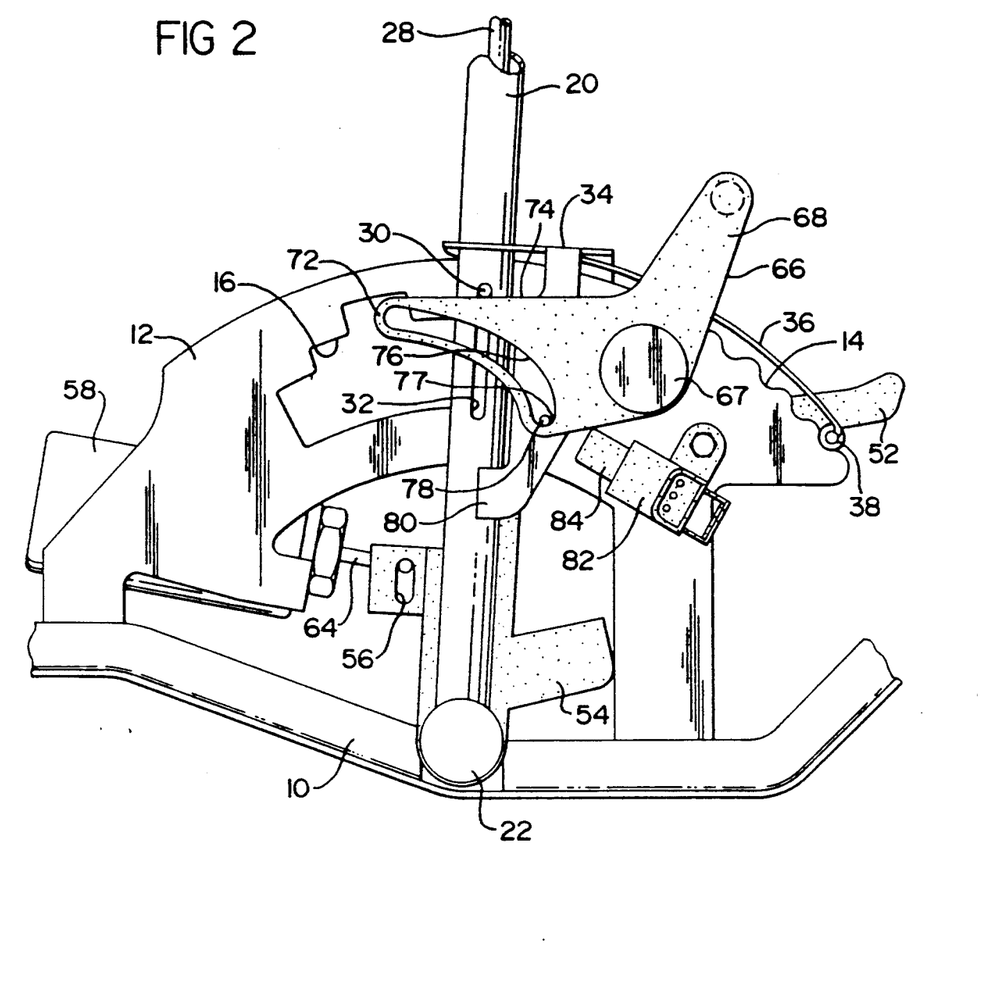
FIG. 2 is an opposite partial side elevational view of the shift mechanism of FIG. 1, with the blocking arm again shown in block position.

The drawings illustrate a shifter mechanism which is quite similar to, and is an improvement on, the shifter mechanism disclosed in U.S. Pat. No. 5,062,509 to Carpenter et al, which is hereby incorporated by reference. Referring to FIGS. 1 and 2, a shifter mechanism according to this invention comprises a stamped steel base bracket 10, which mounts a vertical control plate 12.

Control plate 12 has a rooster-comb-type detent formation 14 on its forward upper edge and has a cutout pattern forming a shift gate 16. A transversely-extending cylindrical hub 18 is fixed on the top of bracket 10 beneath control plate 12. A shift lever 20 has a transversely mounted pin 22 on its lower end which is journaled in hub 18 to provide a pivotal mounting for lever 20. Shift lever 20 has a T-shaped handle 24 at the top and a thumb-operated push button 26 at one end of handle 24.

Figure 5:
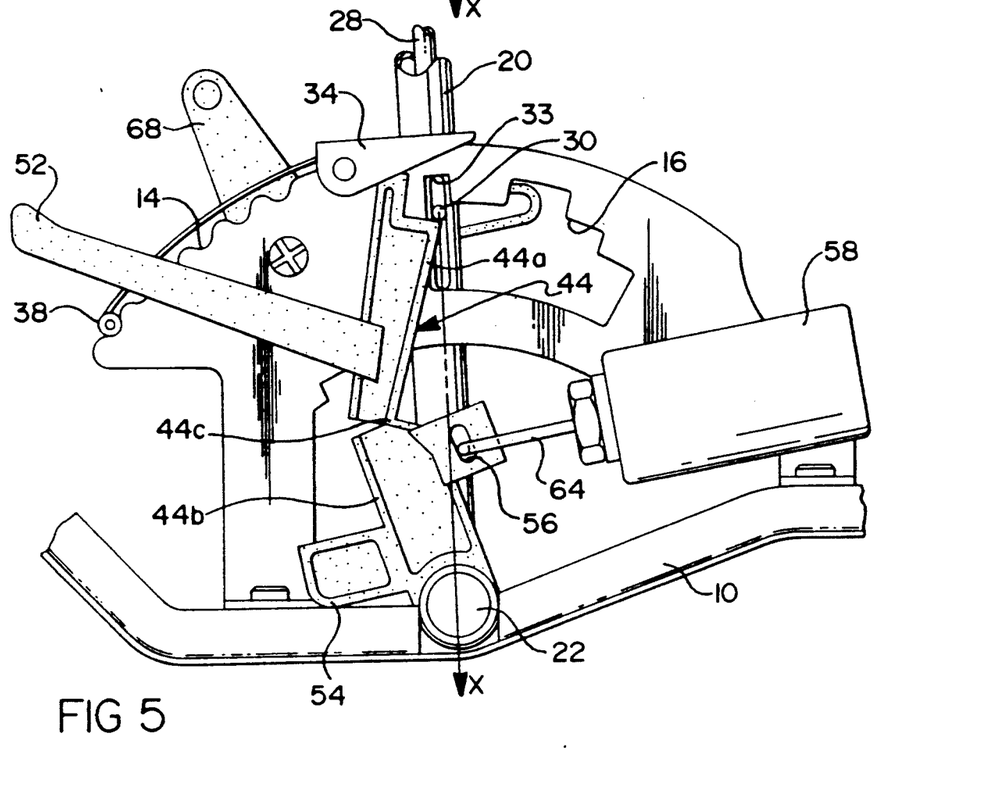
FIG. 5 is a view similar to FIG. 4, with the blocking arm shown fully articulated by the force of the locking pin after nearly movement by the solenoid actuator.

Shift lever 20 is tubular and contains an axially-shiftable release rod 28 which is operated by push button 26. A pin 30 is secured transversely in release rod 28 and extends outwardly through opposed slots 32 in tubular shift lever 20, as best shown in FIGS. 2 and 5. Pin 30 extends through gate 16 in control plate 12. Pin 30, together with gate 16, define the P-R-N-N-D-L selector positions. The Park position shown in FIG. 1 is defined by a deep upward notch 33 in gate 6 which traps pin 30 to prevent pivotal shift lever movement unless pin 30 is depressed downwardly to clear the notch.

A small plate 34, secured to lever 20 just above control plate 12, supports a spring steel detent element 36 having a free end 38 biased against rooster-comb formation 14 to positively locate lever 20 in any of several shift positions. Small plate 34 also has a downturned flange 40 which holds a knob 42 for attachment of a transmission control cable, not shown.

A blocking member or arm 44, which is preferably molded from a light strong polymer, is journaled on pin 22 adjacent lever 20 and extends alongside lever 20 toward pin 30. Blocking arm 44 comprises a pair of segments 44a and 44b interconnected by an integral, or so-called "living", hinge 44c.

Figure 4:
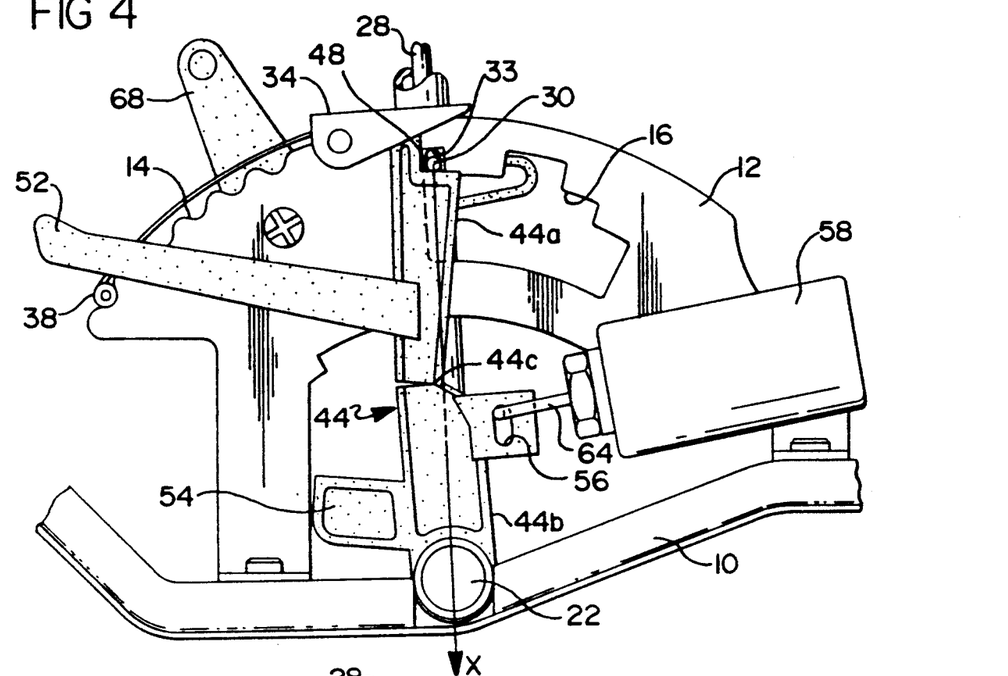
FIG. 4 s a view similar to FIG. 1, with the blocking arm shown slightly articulated by the force of the locking pin just after initial movement by the solenoid actuator.

The upper end of arm segment 44a has a notch which defines a shoulder 46, having a radially outer surface 48 which extends perpendicular to the path of movement of locking pin 30, and an upwardly extending finger 50. Finger 50 contacts the side of pin 30 to position surface 48 beneath pin 30, when release rod 28 is in its normal upper position and blocking arm 44 is in its blocking position, as shown in FIG. 1. This prevents downward movement of pin 30 out of notch 33. Blocking arm 44 can swing to a release position, as shown in FIG. 4, so that pin 30 is free to move radially of lever 20 when release rod 28 is actuated.

An arm 52 extends laterally of blocking arm 44 to an operator-accessible site for manual operation of blocking arm 44 in the event of failure of automatic operation. A stop 54 also extends laterally of blocking arm 44 to engage a portion of control plate 12 to limit the swing of blocking arm 44 to a release position. An elongated aperture 56 in one side of blocking arm 44 allows connection to a solenoid 58 which effects movement of blocking arm 44 between blocking and release positions.

Solenoid 58 is mounted on an ear 60 protruding from control plate 12 and is secured by a nut 62. Solenoid 58 has an actuator rod 64 with a bent end which hooks into aperture 56 of blocking arm 44. Actuator rod 64 is biased inwardly by an internal solenoid spring, not shown, to move blocking arm 44 to blocking position when solenoid 58 is not energized. Upon energization, solenoid 58 extends to push blocking arm 44 to the position unblocking movement of shift lever 20.

Referring to FIG. 2, on the side of control plate 12 opposite blocking arm 44, a molded polymer cam 66, in the form of a bell crank, is pivotally mounted on a headed pin 67 which is fixed to control plate 12. An upper arm 68 of cam 66 carries a knob 70 for coupling to a transmission control cable, not shown. A lower arm 72 of cam 66 has an upper surface 74 lying in the path of pin 30 such that cam 66 is rotated to a release position by pin 30 when release rod 28 is moved to a release position. An arcuate slot 76 in arm 72 receives pin 78 carried by shift lever 20. Small plate 34 and shift lever 20 support an arm 80, which carries pin 78 for movement in slot 76 when shift lever 20 is moved throughout its range. Pin 78 resides in one end 77 of slot 76 when in Park position and that end of slot 76 is shaped to accommodate cam rotation due to pin 30 movement.

The remainder of arcuate slot 76 is shaped to be concentric with pin 22 when cam 66 is in release position. Thus, pin 78 can move in slot 76 upon shift lever 20 movement, sliding along the lower surface of slot 76, to hold cam 66 in release position, even though pin 30 may have returned to a position spaced from cam 66.

A lever operated shifter switch 82 mounted on control plate 12 has an actuator button 84 engaging the lower surface of arm 72 of cam 66 for operation upon cam movement. Switch 82 is normally closed when button 84 is released and is moved to open position by cam 66 when pin 30 is depressed or moved to release position. Thus, switch 82 is closed only when shift lever 20 is in Park position and pin 30 is in its upper or normal position. Switch 82 is opened as soon as push button 26 and release rod 28 are operated.

Figure 3:
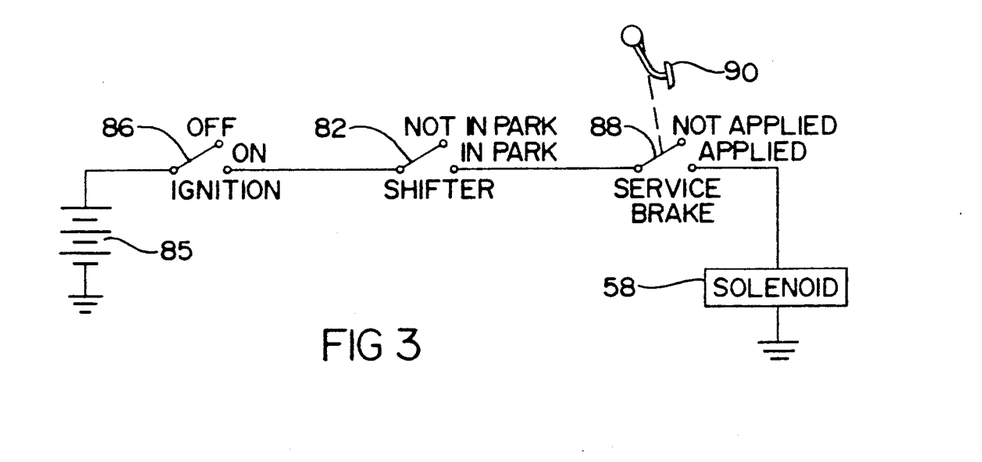
FIG. 3 is a schematic diagram of a control circuit for the shift mechanism according to the invention.

The circuit for energizing solenoid 58 is shown in FIG. 3. The vehicle battery 85 is connected to solenoid 58 through serially connected switches, comprising the vehicle ignition switch 86, a service brake switch 88 operated by brake operator, or pedal 90, and lever-operated shifter switch 82. Ignition switch 86 is closed when the ignition is on, brake switch 88 is closed when the brakes are applied, and shifter switch 82 is closed when shift lever 20 is in Park position and release rod 28 is in normal position.

In operation, shift lever 20 may be moved to Park position by pushing pin 30 against the side of upper arm segment 44a. This will overcome the internal spring force in solenoid 58 and allow pin 30 to slip past arm 44 up into notch 33. When shift lever 20 is in Park position, the engine is running and release rod 28 has not been operated, solenoid 58 will be deenergized and spring force will pull blocking arm 44 into blocking position.

Should push button 26 be depressed, pin 30 will engage blocking arm surface 48 and exert a force along line X. However, no movement of blocking arm 44 will occur, since hinge 44c lies on one side of the pin line of force X. Since surface 48 is perpendicular to the direction of pin force X, arm segments 44a and 44b will only be forced more tightly together. This prevents pin 30 from moving downwardly out of notch 33, thereby locking shift lever 20 into Park position.

To move blocking arm 44 out of blocking position, the service brakes must be applied by depressing brake pedal 90, thereby closing switch 88 and actuating solenoid 58 to move blocking arm 44 out of blocking position. This moves blocking surface 48 out of the path of movement of pin 30. Thereafter, operation of push button 26 and release rod 28 will move pin 30 out of notch 33, enabling movement of shift lever 20 out of the Park position. Depression of pin 30 operates cam 66 to open shifter switch 82. Movement of shift lever 20 from the Park position holds shifter switch 82 open via arcuate slot 76 and pin 78. Thus, shifter switch 82 is held open when push button 26 is returned to normal position. In the event of a circuit failure which prevents energization of solenoid 58, arm 52 of blocking arm 44 may be manually depressed to pivot it to the release position, thereby enabling movement of shift lever 20 to effect vehicle operation.

The preceding is normal operation. However, should pushbutton 26 be prematurely depressed, i.e. before blocking arm 44 is moved out of blocking position by solenoid 58, pin 30 will be forced into contact with surface 48 along line of force X. In prior shifters, the resultant frictional force exerted by pin 30 on blocking arm 44 could easily be greater than the force exerted by solenoid 58. This would bind up blocking arm 44 and prevent its movement out of blocking position and prevent movement of shift lever 20 out of Park position. This would confuse and inconvenience the vehicle operator, since, although he has correctly depressed the brake pedal, he still cannot move the shift lever out of Park position.

However, with this invention, such operator inconvenience and confusion is prevented. Since hinge 44c lies so close to the path of pin 30, i.e. the line of force X exerted by pin 30 on blocking arm surface 48, the solenoid must only pivot blocking arm 44 across this line of force X. This requires only a slight elevation of blocking arm 44 to move it "overcenter", where this pin force will articulate, or "collapse", arm segments 44a and 44b. The pin force moves surface 48 downward as it is pivoted sideward by solenoid 58, as illustrated in FIG. 4. This articulation continues until surface 48 disengages pin 30, thus releasing it from confinement in notch 33, as shown in FIG. 5. Lever 20 may now be moved out of the Park position.

The internal spring in solenoid 58 and the "memory" of hinge 44c will now restore arm segments 44a and 44b to their aligned position shown in FIG. 1. Thus, the articulated configuration of blocking arm 44 enables surface 48 to simultaneously move downward along the path of pin movement, under the force exerted by pin 30, and to be moved laterally out of blocking position by solenoid 58.

In previous arrangements, as in the Carpenter patent, premature operation of pushbutton 26 prevented movement of blocking arm 44 out of blocking position, because solenoid 58 had insufficient force to slide upper arm surface 48 along pin 30. The constant force exerted by pin 30 prevented the very action desired—the removal of blocking arm 44 from blocking position so that shift lever 20 could be moved out of Park position.

In contrast, by using the articulated blocking arm of this invention, this sliding action is obviated, since solenoid 58 need only move blocking arm 44 slightly overcenter to enable arm segments 44a and 44b to collapse. In this case, the force exerted by pin 30 not only does not prevent movement of blocking arm 44, but, instead, actually assists in this movement by collapsing arm 44. However, this can occur only after solenoid 58 is actuated. This overcenter arrangement of hinge 44c prevents accidental movement of shift lever 20 out of Park position.

One form of blocking arm 44 has been described above. It has been found that the length of upper segment (44a in FIGS. 1, 4 and 5) affects the force needed to move blocking arm 44 overcenter. If the pivot between arm segments is lowered, thus lengthening the upper arm segment, less force is required to move the blocking arm overcenter. This occurs because the vertical elevation required to move the upper arm through the small arc needed to move it overcenter decreases as the radius from the pivot point (i.e. the arm length) increases.

Figure 6:
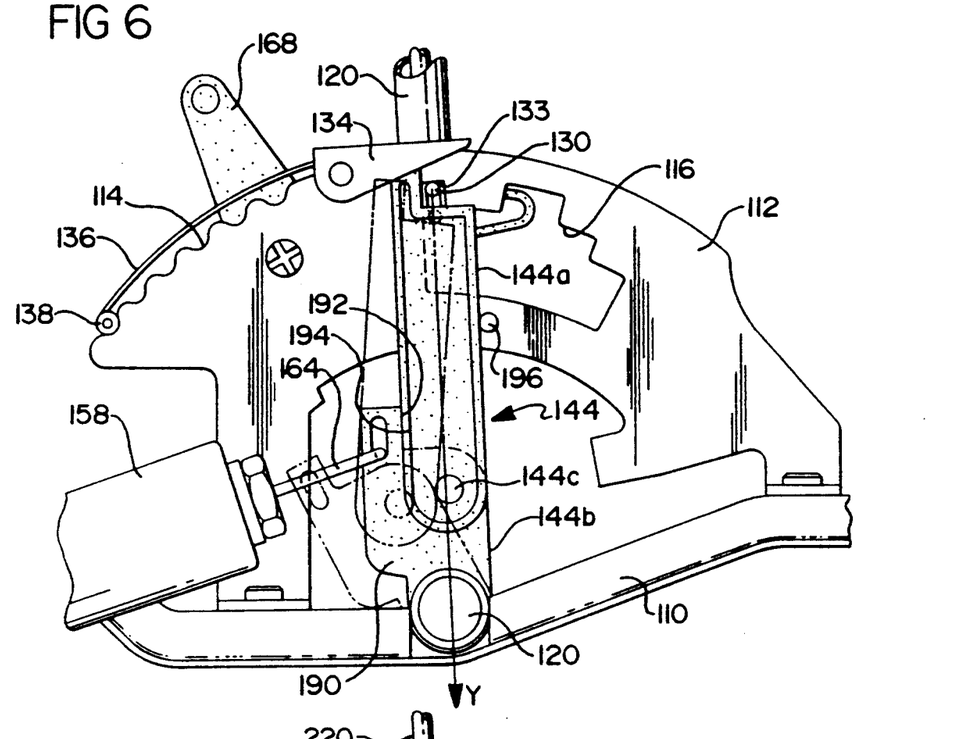
FIG. 6 is a side elevational detail view of a preferred embodiment of a blocking arm.

FIG. 6 illustrates a preferred form of the blocking arm, in which like elements are designated by like reference numerals increased by 100 (e.g. shift lever 120). Here, blocking arm 144 includes an upper portion 144a that is pivoted to a separate lower portion 144b by a hinge pin 144c. Lower arm portion 144b is pivoted to the shifter mounting bracket 110 by a pin 122 and includes an offset leg 190 containing slot 156 which receives solenoid actuator arm 164.

In this embodiment, a pull-type solenoid 158 is utilized, similar to that shown in the referenced Carpenter patent. Thus, solenoid actuator arm 164 is spring-biased outward to the illustrated solid line position. Upper arm portion 144a includes a finger 150 that cradles locking pin 130.

Leg 190 includes a shoulder 192 that engages the rear surface 194 on upper arm segment 144a. This rigidifies blocking arm 144 and forces it against a stop pin 196 on plate 112 in the illustrated blocking position. In this position, the line of force Y of pin 130 is slightly to the right of the center of hinge pin 144c.

Upon actuation, solenoid 158 will retract actuator arm 164, pulling arm segment 144b leftward. This moves hinge pin 144c overcenter, across pin force line Y, to collapse blocking arm 144 and move surface 148 down and away from pin 130. This collapse continues until arm 144 reaches the phantom line position in which surface 148 has disengaged pin 130, freeing the pin for movement out of notch 133.

Since the pivot between the arm segments 144a and 144b has been lowered, the elevation of surface 148 necessary to move blocking arm 144 overcenter is less than with the FIGS. 4 and 5 embodiment. Consequently, the force required of the solenoid is proportionally reduced.

Figure 7:
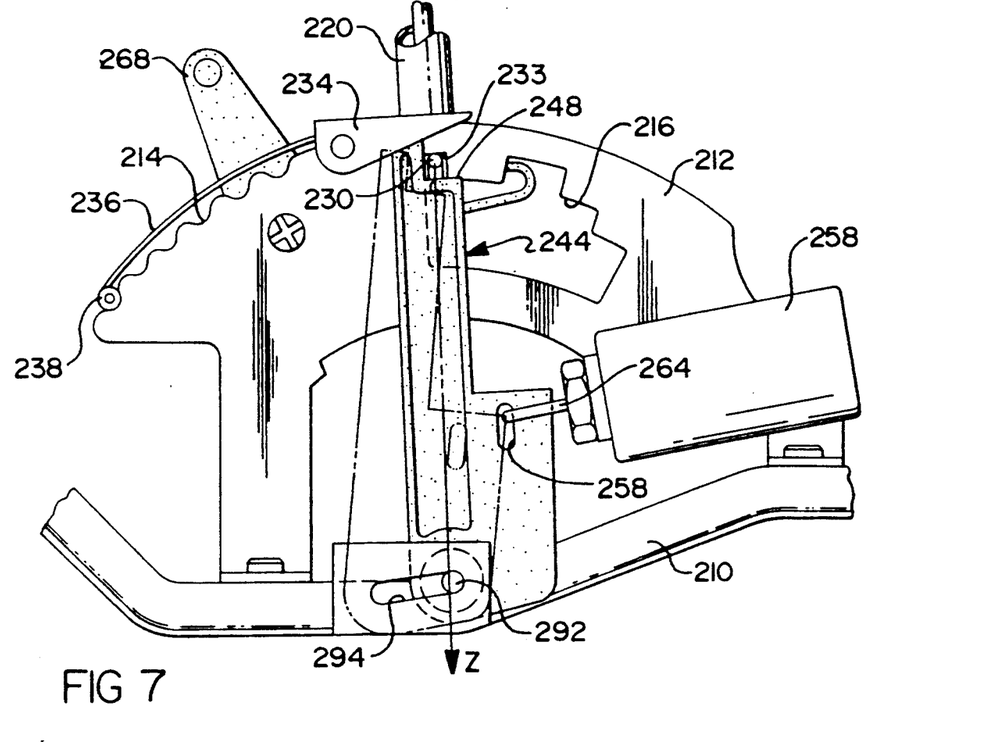
FIG. 7 is a view similar to FIG. 6, showing an alternative embodiment of a blocking arm.

An alternative embodiment of the blocking arm is shown in FIG. 7, in which like elements are designated by like reference numerals increased by 200 (e.g. shift lever 220). Here, a single element blocking arm 244 incorporates a pin 292 which is received in an elongated slot 294 formed in shifter base 210. This pin-and-slot arrangement enables horizontal movement of arm 244 by actuator arm 264 of push-type solenoid 258. The engagement of hinge pin 292 and the inner bearing surface of slot 294 forms the movable hinge.

In the illustrated solid line position, the line of force Z of locking pin 230 lies slightly rightward of the center of pin 292 and jams it against the right end of slot 294. Since the movable hinge has been lowered as far as possible, the solenoid force required to lift blocking arm 244 overcenter is minimal.

In operation, activation of solenoid 258 moves arm 244 and hinge pin 292 leftward, across pin line of force Z. This moves the hinge point overcenter and allows arm 244 to collapse. This enables pin 230 to force surface 248 downward, as solenoid 258 pushes arm 244 leftward, out of blocking position. This continues until surface 248 disengages pin 230, as shown in phantom lines. Pin 230 is now free for movement out of notch 233.

One disadvantage of this embodiment is the friction between hinge pin 292 and the inner bearing surface of slot 294, which produces a force proportional to the force exerted by locking pin 230. This friction force increases the force needed for the release of blocking arm 144. It would, therefore, be necessary that this friction be minimized, such as through the use of an antifriction coating.

Thus, this invention provides a brake-transmission interlock having a blocking arm that cannot be bound up by premature depression of the shifter release button. While only a preferred and alternative embodiments have been illustrated and described, obvious modifications thereof are contemplated within the scope of this invention and the following claims.

Other embodiments or configurations of the blocking arm can produce like results. It is only necessary to configure or mount the blocking arm so that, (a) in blocking position, the release force exerted by the locking pin be incapable of moving the blocking arm out of blocking position, and that (b) after slight movement of the blocking arm by the actuator, this release force exerted by the locking pin be utilized to move the blocking arm downward along the path of pin movement, permitting the actuator to remove the blocking arm from blocking position, which (c) frees the locking pin for movement out of the confining notch so that (d) the shift lever can be moved out of Park position.

I claim:

1. In a vehicle having an automatic transmission having a Park and other positions and a service brake operator, an automatic transmission shifter comprising a base mounting a shift gate which defines a plurality of notches corresponding to the Park and other transmission positions, a shift lever mounted on the base for movement between the Park and other transmission positions, a locking pin carried by the shift lever for movement along a path on the shift lever into the shift gate Park notch to lock the shift lever in Park position and for movement out of said notch to enable shift lever movement out of Park position, a blocking arm mounted on the base for movement into and out of a blocking position in the path of movement of the locking pin when the shift lever is in Park position and having an outer surface engageable by the locking pin to block movement of the locking pin out of said notch, and an actuator mounted on the base normally locating the blocking arm in blocking position and actuatable in response to operation of the service brake operator to move the blocking arm out of blocking position, characterized by the blocking arm having movable pivot means enabling movement of the blocking arm outer surface along said path out of engagement with the locking pin when the actuator begins moving the locking arm out of said path.

2. The automatic transmission shifter of claim 1, wherein the movable pivot means include a movable hinge about which the blocking arm pivots upon movement by the actuator to enable movement of the outer surface along said path.

3. The automatic transmission shifter of claim 2, wherein the blocking arm comprises a pair of segments interconnected by the hinge which is the movable pivot and which lies to one side of the locking pin path when the locking arm is in blocking position, whereby a force exerted by the locking pin on the blocking arm forces the arm segments rigidly together, and whereby movement of the hinge to the other side of the locking pin path by the actuator enables a force exerted by the locking pin to articulate the arm segments, moving the blocking arm surface along said path to disengage the locking pin as the locking arm is moved out of blocking position by the actuator.

4. The automatic transmission shifter of claim 3, wherein the blocking arm outer surface is perpendicular to the path of movement of the locking pin.

5. The automatic transmission shifter of claim 4, wherein the shift lever and the blocking arm are commonly pivoted on the base of independent movement along said shift gate.

6. The improvement of claim 5, wherein the blocking arm is a unitary piece of plastic having the segments interconnected by an integral hinge.

7. The automatic transmission shifter of claim 5, wherein the blocking arm comprises independent segments interconnected by a hinge pin.

8. The automatic transmission shifter of claim 2, wherein the movable hinge is a pin and slot arrangement.

9. In a vehicle having an automatic transmission having a Park and other positions, an ignition switch, and a service brake operator, an automatic transmission shifter comprising
   a base mounting a shift gate which defines a plurality of notches corresponding to the Park and other transmission positions,
   a shift lever mounted on the base for pivotable movement between the Park and other transmission positions,
   a locking pin carried by the shift lever for movement along a radial path into the shift gate Park notch to lock the shift lever in Park position and for movement out of said notch to enable shift lever movement out of Park position,
   a blocking arm mounted on the base and having a movable hinge enabling movement of the blocking arm into and out of a blocking position in the path of movement of the locking pin when the shift lever is in Park position and having an outer surface perpendicular to the path of pin movement and engageable by the locking pin to block movement of the locking pin out of said notch, and
   an actuator mounted on the base comprising an electric solenoid normally locating the blocking arm in blocking position and actuatable in response to operation of the service brake operator and closure of the ignition switch to move the blocking arm out of blocking position, characterized by
   the blocking arm hinge enabling the blocking arm to collapse inwardly away from the locking pin along said path in response to pin force upon initial movement of the blocking arm out of blocking position by the solenoid and to enable subsequent movement of the blocking arm by the solenoid to disengage the outer surface from the locking pin.

10. The automatic transmission shifter of claim 9, wherein the blocking arm comprises a pair of segments interconnected by the hinge which lies to one side of the locking pin path when the locking arm is in blocking position, whereby a force exerted by the locking pin on the blocking arm forces the arm segments rigidly together, and whereby movement of the hinge to the other side of the locking pin path by the actuator enables a force exerted by the locking pin to articulate the arm segments, thus moving the blocking arm surface along said path to disengage the locking pin as the locking arm is moved out of blocking position by the actuator.

11. The automatic transmission shifter of claim 10, wherein the shift lever and one of the blocking arm segments are commonly pivoted on the base of independent movement along said shift gate.

12. The automatic transmission shifter of claim 11, wherein the blocking arm is a unitary piece of plastic having the segments interconnected by an integral hinge.

13. The automatic transmission shifter of claim 11, wherein the blocking arm comprises independent segments interconnected by a hinge pin.

14. The improvement of claim 9, wherein the movable hinge is a pin and slot arrangement.

15. In a transmission shifter having a shift gate defining a locking notch, a shift lever movable along said gate into and out of alignment with said notch, and a locking pin carried by the lever for movement along a path on the lever into and out of said notch, the improvement comprising
   a blocking arm movable into and out of a normal blocking position in the path of pin movement and having an outer surface engageable by the locking pin, and
   an actuator for moving the blocking arm,
   said blocking arm having a movable hinge which lies to one side of the locking pin path when the locking arm is in blocking position to prevent movement of the blocking arm out of blocking position by a force exerted by the blocking arm outer surface by the locking pin,
   said blocking arm being movable by the actuator to move the hinge to the other side of the locking pin path to enable a force exerted by the locking pin to pivot the blocking arm on the hinge to move the blocking arm surface along said path to disengage the locking pin as the locking arm is moved out of blocking position by the actuator.

16. The improvement of claim 15, wherein the blocking arm comprises a pair of segments interconnected by the hinge, the outer end of one segment being pivotally mounted on the shifter and the outer end of the other segment having pin on said outer surface, whereby a force exerted by the locking pin on said outer surface forces the arm segments rigidly together, and whereby movement of the hinge to the other side of the locking pin path by the actuator enables a force exerted by the locking pin to articulate the arm segments and move the blocking arm surface along said path to disengage the locking pin as the locking arm is moved out of blocking position by the actuator.

17. The improvement of claim 16, wherein the blocking arm is a unitary piece of plastic having the segments interconnected by an integral hinge.

18. The improvement of claim 17, wherein the shift lever and the blocking arm are commonly pivoted for independent movement along said shift gate.

19. The improvement of claim 16, wherein the blocking arm comprises independent segments interconnected by a hinge pin.

20. The improvement of claim 15, wherein the movable hinge is a pin and slot arrangement.

* * * * *

UNITED STATES PATENT AND TRADEMARK OFFICE
CERTIFICATE OF CORRECTION

PATENT NO. : 5,314,049
DATED : May 24, 1994
INVENTOR(S) : Nordstrom et al

It is certified that error appears in the above-indentified patent and that said Letters Patent is hereby corrected as shown below:

Col. 9, line 9, "base of" should read --base for--

Col. 10, line 45, "having pin on" should read --having--

Signed and Sealed this

Twenty-third Day of August, 1994

Attest:

BRUCE LEHMAN

Attesting Officer

Commissioner of Patents and Trademarks